(12) United States Patent
Tsuda (10) Patent No.: US 7,812,559 B2
(45) Date of Patent: Oct. 12, 2010

(54) WINDSHIELD CONTROLLER FOR MOTORCYCLE

(75) Inventor: Haruka Tsuda, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 384 days.

(21) Appl. No.: 12/056,101

(22) Filed: Mar. 26, 2008

(65) Prior Publication Data

US 2008/0236922 A1 Oct. 2, 2008

(30) Foreign Application Priority Data

Mar. 30, 2007 (JP) ............................. 2007-090620

(51) Int. Cl.
*B62J 17/04* (2006.01)
(52) U.S. Cl. ..................... 318/468; 318/266; 318/286
(58) Field of Classification Search ......... 318/264–267, 318/272, 275, 277, 281–286, 445, 466–470
See application file for complete search history.

(56) References Cited

U.S. PATENT DOCUMENTS 4,355,838 A * 10/1982 Hickman .................. 296/78.1
5,195,797 A * 3/1993 Hobbs ...................... 296/77.1
5,857,727 A * 1/1999 Vetter ...................... 296/78.1
7,281,750 B1 * 10/2007 Wise ........................ 296/78.1
2008/0111392 A1 * 5/2008 Masuda et al. ............ 296/78.1

FOREIGN PATENT DOCUMENTS

| EP | 1 170 201 A2 | 1/2002 |
| JP | 2992455 B2 | 10/1999 |
| JP | 2002-87356 A | 3/2002 |

* cited by examiner

*Primary Examiner*—Bentsu Ro
(74) *Attorney, Agent, or Firm*—Birch, Stewart, Kolasch & Birch, LLP (57) ABSTRACT

A windshield controller for a motorcycle includes a receiver which receives a signal transmitted from a portable communication device; a start permission device which judges whether or not to permit start of an engine based on the signal received by the receiver; and a control device which controllably drives a movable windscreen disposed on a cowling at a front portion of a vehicle body, wherein the control device judges whether or not the portable communication device is away from the vehicle body based on the signal received by the receiver, and when it is judged that the portable communication device is away from the vehicle body, the control device controls to move the movable windscreen to a standby position.

15 Claims, 10 Drawing Sheets

S1: SIGNAL STRENGTH OF SIGNAL CONTAINING IDENTIFICATION INFORMATION ID IS NOT GREATER THAN THRESHOLD L1?

S2: MOVE WINDSCREEN TO A STANDBY POSITION.

S3: IDENTIFICATION INFORMATION ID IN RECEIVED SIGNAL DOES NOT AGREE WITH REGISTRATION INFORMATION ID0?

WINDSHIELD CONTROLLER FOR MOTORCYCLE

CROSS-REFERENCE TO RELATED APPLICATIONS

This nonprovisional application claims priority under 35 U.S.C. §119(a) on Patent Application No. 2007-090620, filed in Japan on Mar. 30, 2007, the entirety of which is incorporated herein by reference.

BACKGROUND OF THE INVENTION

1. Field of the Invention

The present invention relates to a windshield controller, and more particularly to a windshield controller for a motorcycle provided with a movable windscreen.

2. Background of the Invention

There is known a motorcycle that is provided with a height-adjustable, movable windscreen on a cowling at the front portion of a vehicle body. Examples of this type of movable windscreen are disclosed in Japanese Patent No. 2992455, which is moved by operating a switch provided on a handlebar and Japanese Patent Laid-open No. 2002-87356, which can be moved upon detection of parking operation. In Japanese Patent Laid-open No. 2002-87356, examples of the parking operation include turning a main switch off, switching a side stand or main stand to a standing position, operating a parking brake, and the lighting state of a hazard lamp. The movable windscreen is lowered upon detection of parking operation.

However, in Japanese Patent No. 2992455, it is necessary to provide a dedicated switch for moving the movable screen, and a user has to operate the switch manually in order to lower the windshield. In Japanese Patent Laid-open No. 2002-87356, although the windscreen is automatically lowered once the parking operation is detected, it is necessary to use a detection component for detecting the parking operation.

SUMMARY OF THE INVENTION

The present invention has been made in view of the forgoing circumstance and provides a windshield controller for a motorcycle that can move a windscreen at an appropriate height at the time of parking or the like even if a windscreen operating switch or a parking operation detecting component is not provided.

To achieve the above-mentioned object, according to a first aspect of the present invention, a windshield controller for a motorcycle includes.

Furthermore, according to a second aspect of the present invention, the control section which controllably drives the windscreen disposed on the cowling for the front portion of the vehicle body judges whether or not the portable communication device is away from the vehicle body on the basis of the signal received by the receiver section. If it is judged that the portable communication device is away from the vehicle body, the windscreen is moved to the standby position. Thus, it is not necessary to perform switch operation for operating the windscreen, and it is possible to move the windscreen to an appropriate height during parking without using a component for detecting user's parking-operation.

Furthermore, according to a third aspect of the present invention, the control section judges whether or not the signal strength of the transmitted signal is less than a predetermined threshold value. If the signal strength is less than the threshold value, it is judged that the portable communication device is away from the vehicle body. Thus, it is possible to accurately judge whether or not the user carrying the portable communication device dismounts from the motorcycle based on the signal strength.

Furthermore, according to a fourth aspect of the present invention, the control section judges whether or not identification information contained in the received transmission signal matches registration information. If the identification information does not match the registration information, it is judged that the portable communication device is away from the vehicle body. Thus, it is possible to accurately judge whether or not the user carrying the portable communication device dismounts from the motorcycle.

Furthermore, according to a fifth aspect of the present invention, since the standby position is taken as the lowest position of the movable windscreen, even if strong wind blows during the parking, the influence of the strong wind on the vehicle body can be significantly reduced. It also can significantly reduce the range for the light-focusing countermeasure in the motorcycle.

Furthermore, according to a sixth aspect of the present invention, the control section judges whether or not the portable communication section is close to the vehicle body on the basis of the signal received by the receiver section. If it is judged that the portable windscreen is close to the vehicle body, the windscreen is moved to a restoration position. Thus, it is not necessary to manually perform switch operation for operating the windscreen and it is possible to move the windscreen to an appropriate height during parking without using a component for detecting user's parking-operation.

Furthermore, according to a seventh aspect of the present invention, the windshield controller further includes a restoration position input-purpose operating section which inputs a restoration position; and a storage section which stores the restoration position inputted. The control section moves the windscreen to the restoration position stored in the storage section. Thus, it is possible to move the windscreen to the height desired by the user at time of ride.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE ILLUSTRATED EMBODIMENTS

The present invention will now be described in detail with reference to the accompanying drawings, wherein the same reference numerals will be used to identify the same or similar elements throughout the several views. It should be noted that the drawings should be viewed in the direction of orientation of the reference numerals. It should also be noted that the directions such as the front, the rear or back, the left, the right, the upside, the lower side and the like are described with respect to a vehicle body.

Figure 1:
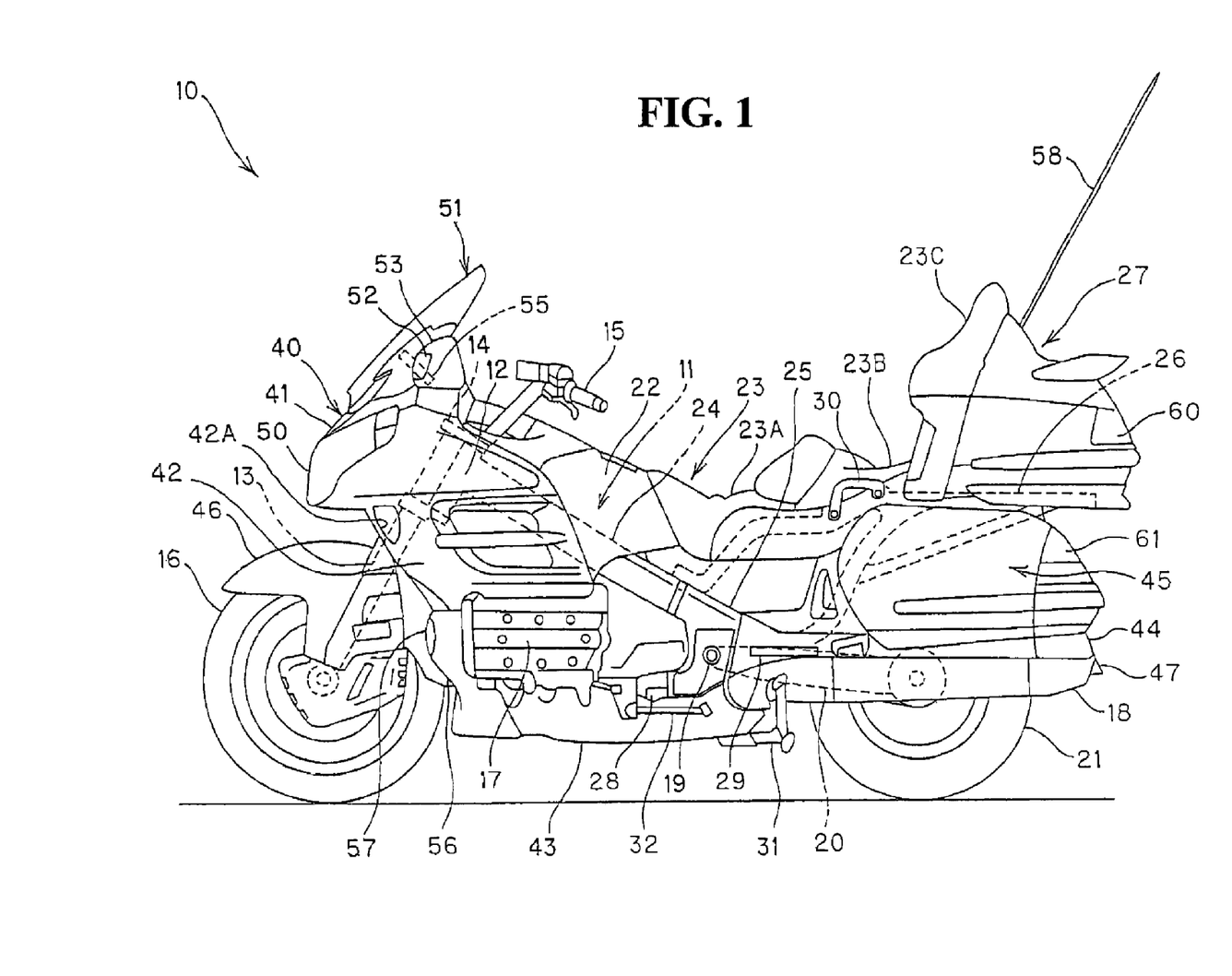
FIG. 1 is a lateral view of a motorcycle in accordance with an embodiment of the present invention.
Figure 2:
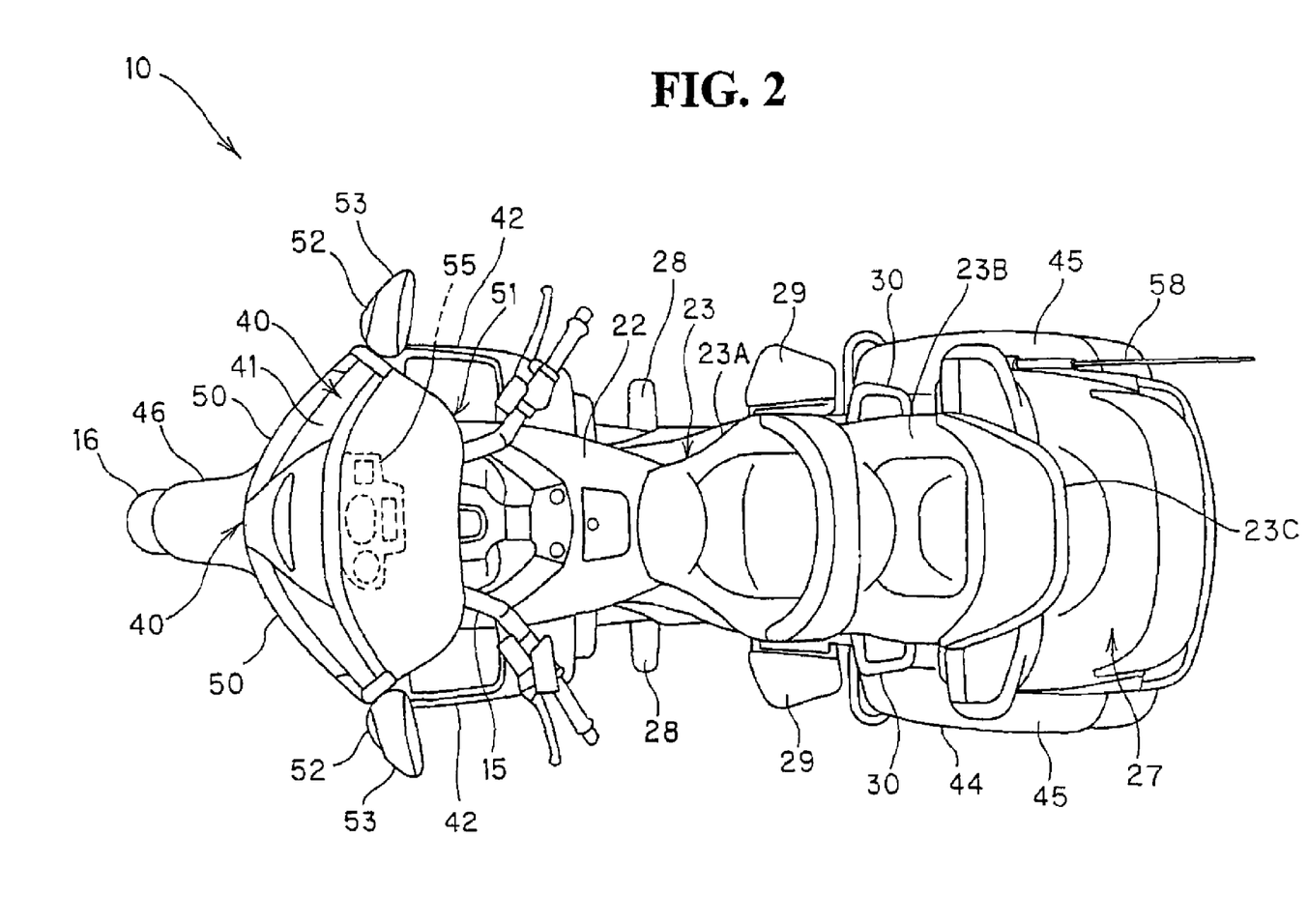
FIG. 2 is a plan view of the motorcycle in accordance with an embodiment of the present invention.
Figure 3:
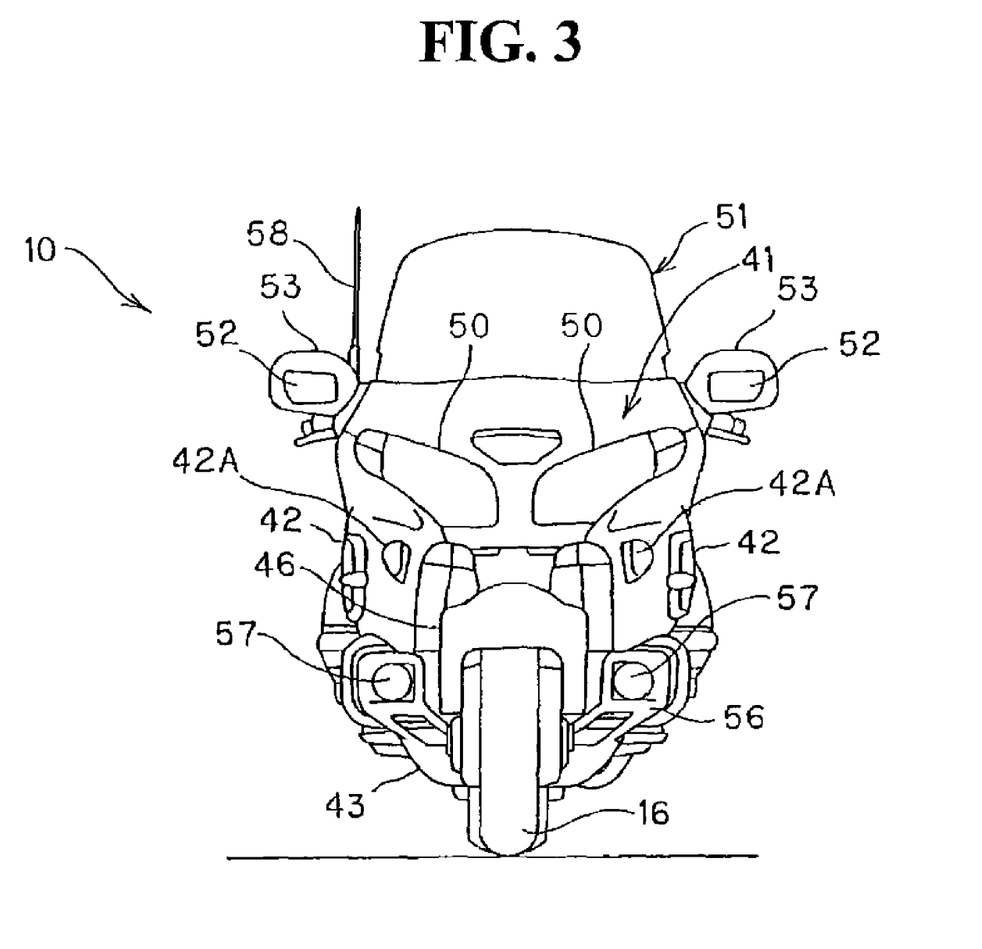
FIG. 3 is a front view of the motorcycle in accordance with an embodiment of the present invention.
Figure 4:
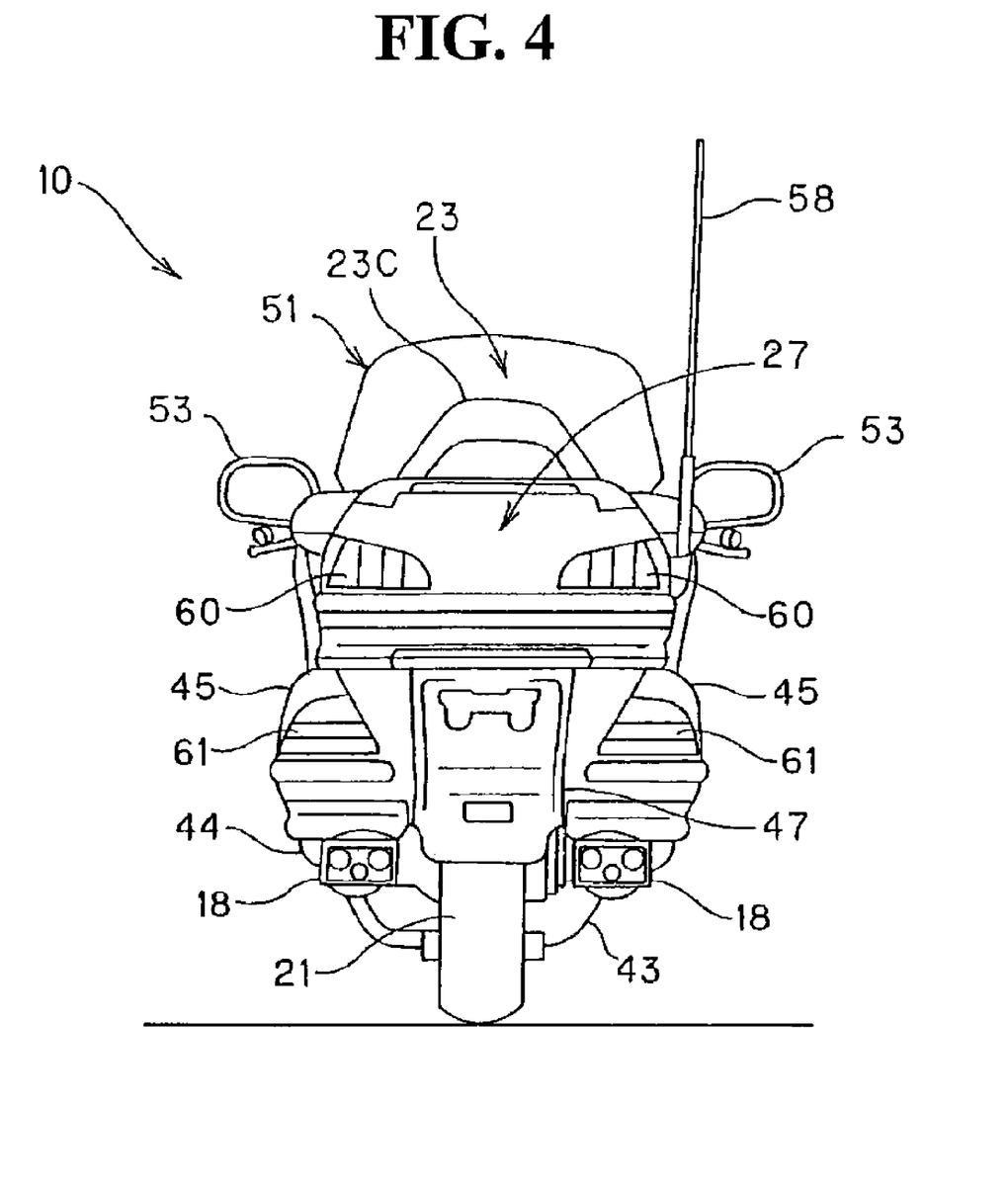
FIG. 4 is a rear view of the motorcycle in accordance with an embodiment of the present invention.

FIG. 1 is a lateral view of a motorcycle according to an embodiment of the present invention. FIG. 2 is a plan view of the motorcycle. FIG. 3 is a front view of the motorcycle. FIG. 4 is a rear view of the motorcycle.

Referring to FIGS. 1 and 2, the motorcycle 10 includes a body frame 11; a pair of left and right front forks 13 turnably supported by a head pipe 12 attached to the front end of the body frame 11; a steering handlebar 15 attached to a top bridge 14 supporting the upper end of the front forks 13; and a front wheel 16 rotatably supported by the front forks 13. The motorcycle 10 further includes an engine 17 supported by the body frame 11; an exhaust muffler 18 connected to the engine 17 via an exhaust pipe (not shown); a rear fork 20 up and down swingably supported by a pivot 19 located at the rear-lower portion of the body frame 11; and a rear wheel 21 rotatably supported by the rear end of the rear fork 20. Rear cushions (not shown) are disposed between the rear fork and the body frame 11.

The body frame 11 includes a pair of right and left main frames 24 which branch right and left from the head pipe 12 and extend rearward and obliquely downwardly; pivot plates 25 connected respectively to the rear portions of the main frames 24; and a pair of left and right seat rails 26 which extend rearward and obliquely upwardly from front and rear portions of the pivot plates 25. The engine 17 is located below the main frames 24, and a fuel tank 22 is located above the main frames 24. An occupant's seat 23 is mounted on the upper portion of the seat rails 26, and a grab rail 30 and a trunk box 27 are mounted to the rear portion of the seat rail 26.

The occupant's seat 23 includes a front seat 23A which extends rearward of the fuel tank 22 and on which a rider sits; a rear seat 23B which is formed rearward of the front seat 23A to be raised and on which a pillion passenger sits; and a pillion passenger's backrest 23C. The pivot plate 25 of the body frame 11 is attached with a pair of left and right steps (the rider's foot-placed steps 28 for a rider sitting on the front seat 23A, and with a pair of left and right steps (pillion passenger's foot-placed steps) 29 for the pillion passenger sitting on the rear seat 23B. The grab rail 30 to be grabbed by the pillion passenger. A main stand 31, a sub stand 32, a body cowling 40 described later, etc., are attached to the body frame 11.

The body cowling 40 includes a front fairing 41 covering the vehicle body from the front; a pair of left and right side covers 42 covering the lateral portions of the vehicle body; an under cover 43 covering the lower portion of the vehicle body; and a rear seat cowl 44 covering the rear portion of the vehicle body. The rear seat cowl 44 is formed integrally with a pair of left and right saddlebags 45. A front fender 46 is attached to the front fork 13 so as to cover the front wheel 16. A rear fender 47 is attached to the rear seat cowl 44 so as to cover the rear wheel 21.

Referring to FIG. 3, headlights 50 are provided on the front surface of the front fairing 41, and a windscreen (windshield) 51 is attached above the headlights. Left and right mirrors 53 each incorporating a front blinker 52 are respectively provided at the left and right ends of the front fairing 41. As shown in FIG. 2, vehicle meters 55 are disposed inside of the front fairing 41.

As shown in FIG. 3, the side covers 42 are respectively provided with a pair of left and right air openings 42A adapted to supply outside air from the front of the vehicle to the surrounding of the engine 17. An engine guard 56 is provided left-forward of and right-forward of the engine 17, and a pair of left and right fog lamps 57 are attached to the engine guard 56.

As shown in FIG. 4, a pair of left and right tail lamp units 60 is arranged on the rear surface of the trunk box 27, and rear blinkers 61 are respectively arranged on the rear surfaces of the saddlebags 45. A rod antenna 58 is attached to the right-hand portion of the trunk box 27 to receive radio broadcasting for an audio unit (not shown) incorporated in the motorcycle 10.

Figure 5:
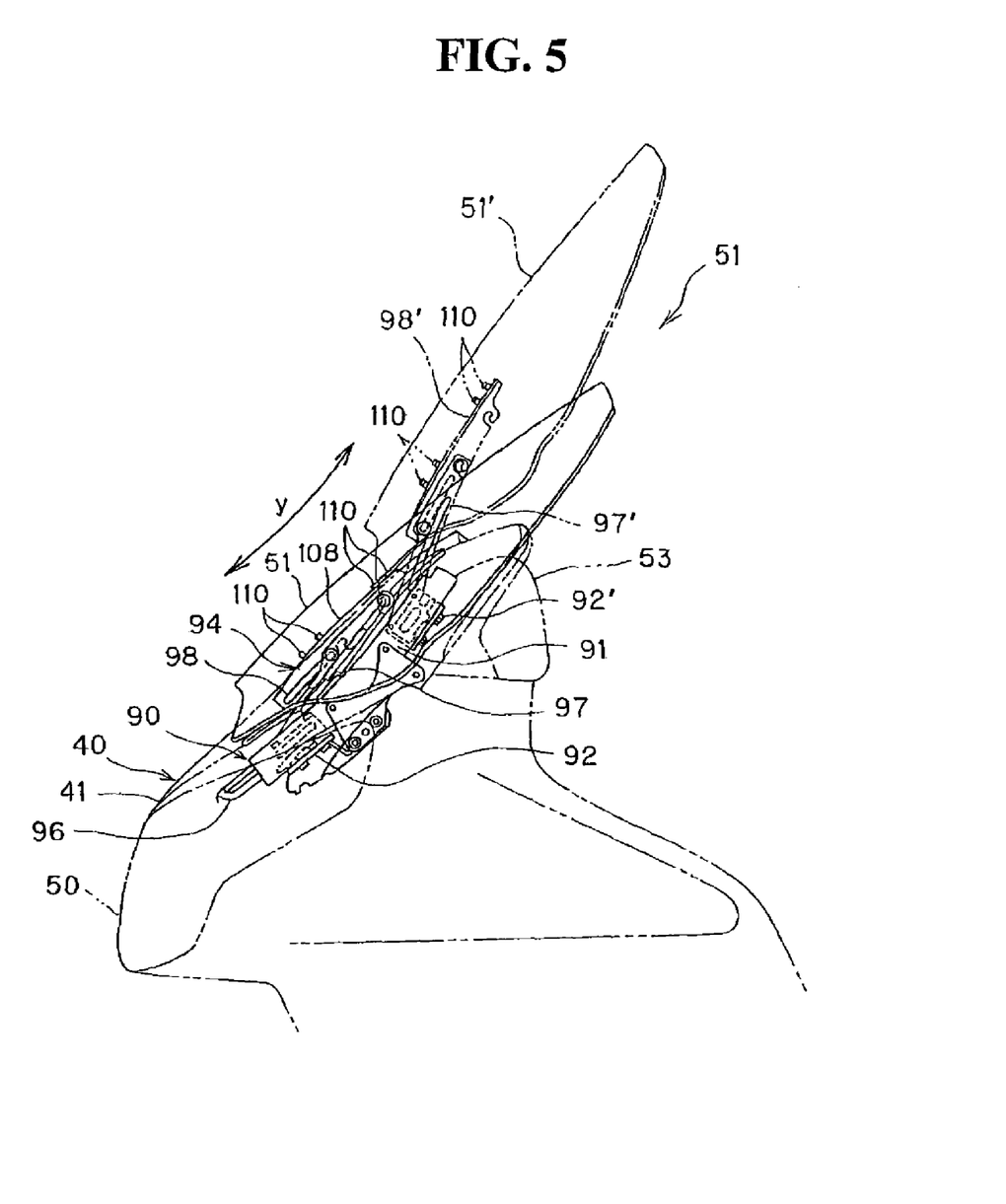
FIG. 5 is a lateral view illustrating a windscreen along with the peripheral configuration thereof in accordance with an embodiment of the present invention.
Figure 6:
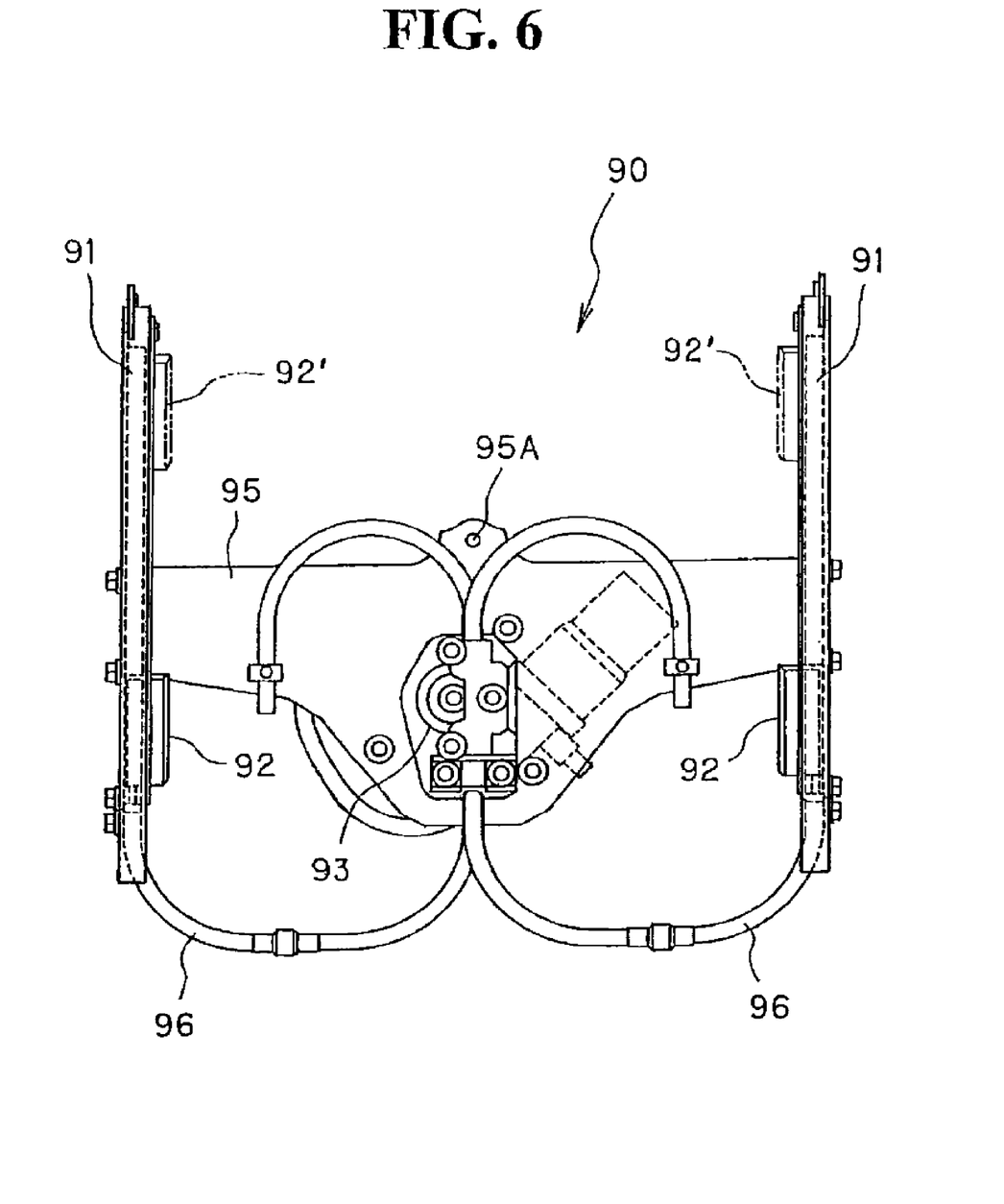
FIG. 6 illustrates a shifter of the windscreen as viewed from the front in accordance with an embodiment of the present invention.
Figure 7:
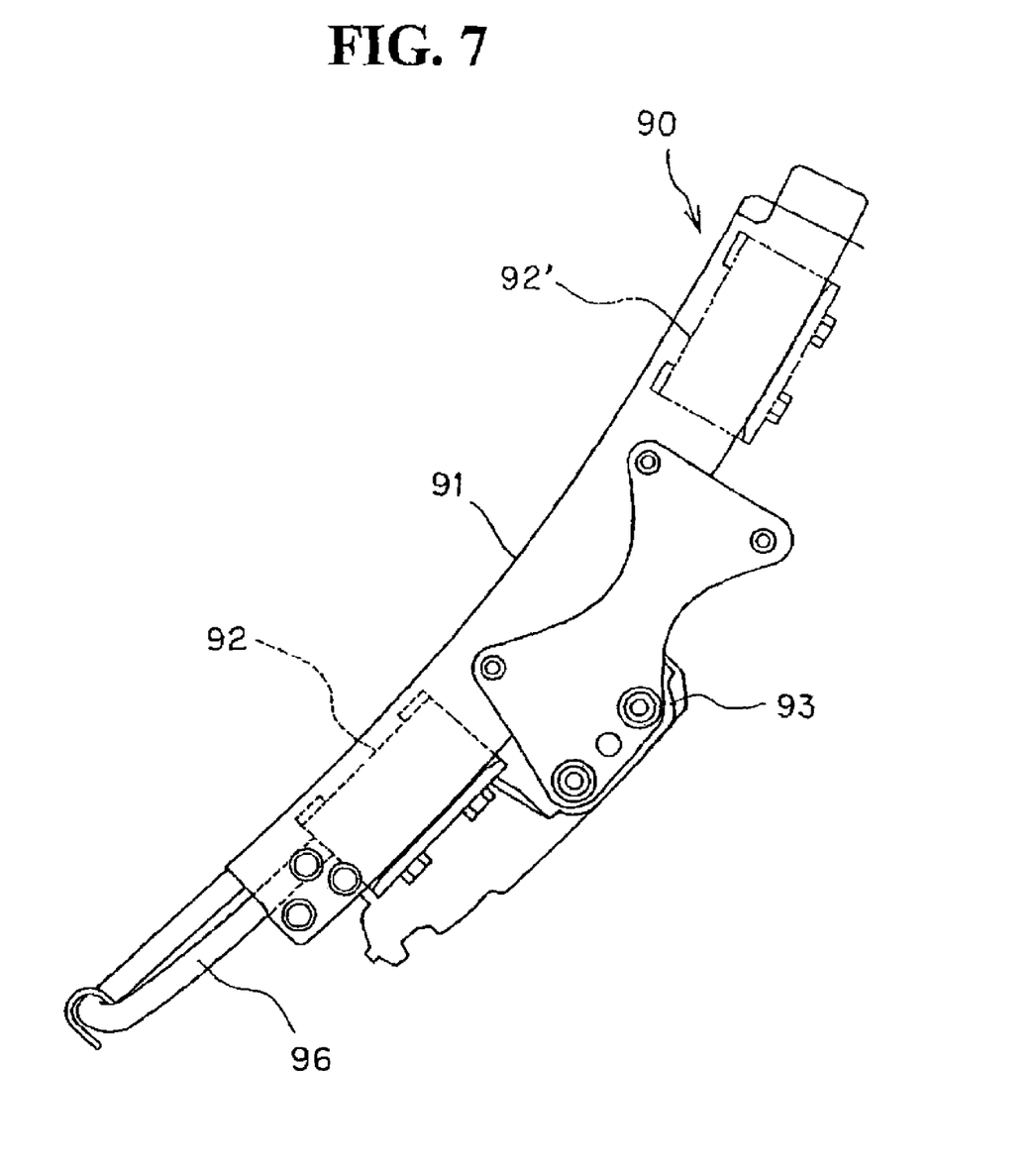
FIG. 7 is a lateral view of the shifter in accordance with an embodiment of the present invention.
Figures 8A, 8B:
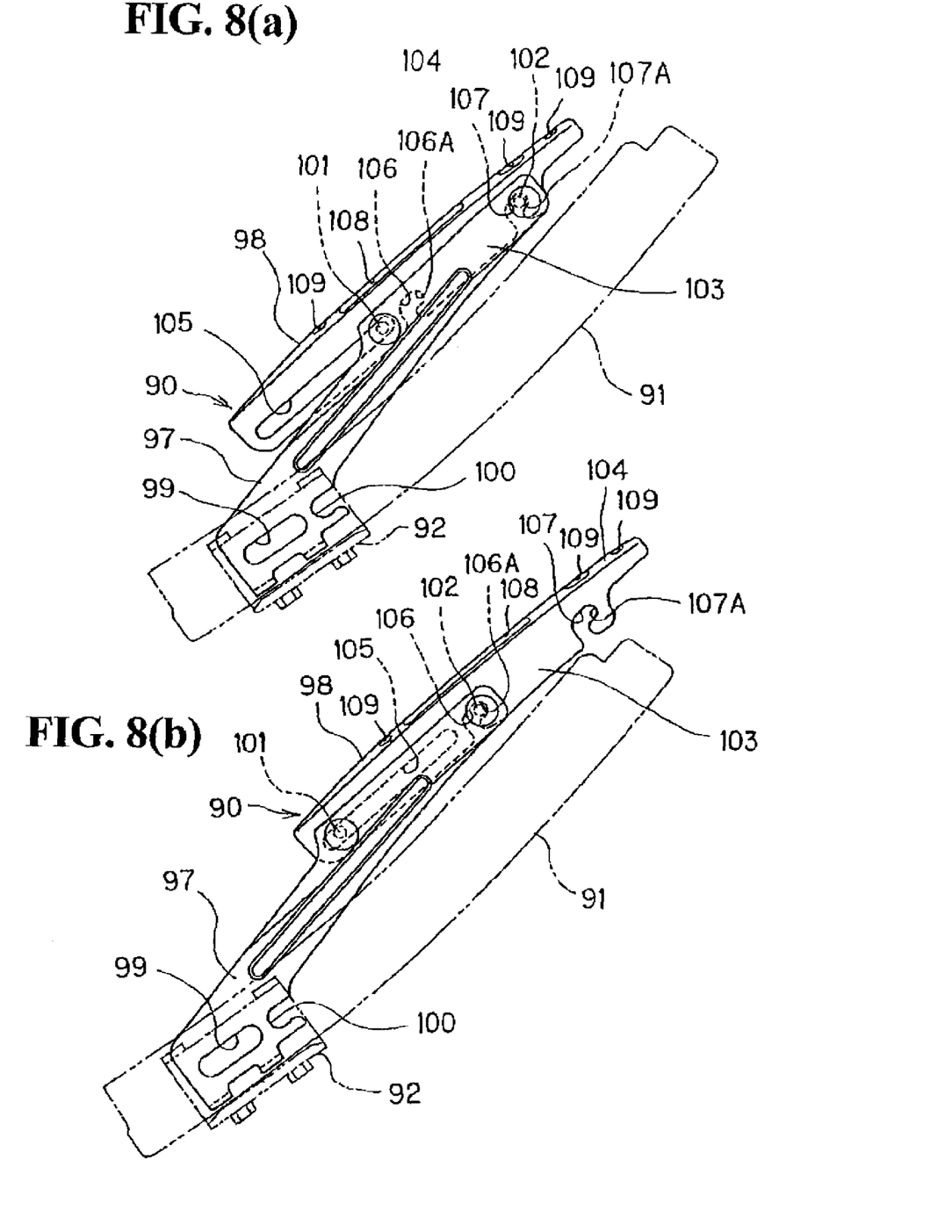
FIGS. 8A and 8B illustrate a connecting portion between the windscreen and the shifter in accordance with an embodiment of the present invention.

In the present configuration, the windscreen 51 is composed as a movable windscreen. FIG. 5 is a lateral view illustrating the windscreen 51 along with the peripheral configurations thereof. FIG. 6 is a front view of a shifter 90 for the windscreen 51. FIG. 7 is a lateral view of the shifter 90. FIGS. 8A and 8B illustrate a connecting portion between the windscreen 51 and the shifter 90.

Referring to FIG. 5, the windscreen 51 is provided above the front fairing 41 covering the front upper portion of the vehicle body so as to slant toward the rearward of the vehicle body. In addition, the windscreen 51 is arranged to substantially extend along the slant direction (see arrow y in FIG. 5) of the windscreen 51 so as to be movable by the shifter 90.

As shown in FIG. 6, the shifter 90 for moving the windscreen 51 substantially along the direction of arrow y includes: guide portions 91 attached to the front fairing 41 to extend in the y-direction; movable portions 92 movably supported by the respective guide portions 91; an electric motor 93 serving as a drive device for moving the movable portions 92 along the respective guide portions 91; and a connecting portion 94 for connecting the windscreen 51 with the movable portions 92.

Referring to FIG. 6, the guide portions 91 form a pair of right and left ones and are supported by the respective ends of a support member 95. The support member 95 is a plate-like member. The support member 95 is attached to the inside of the front fairing 41 via a plurality of attachment portions 95A shown in FIGS. 6 and 7 with attach members such as screws. The guide portions 91 are secured to the inside of the front fairing 41 via the supporting member 95.

The movable portion 92 is slidably supported by the guide portion 91. The electric motor 93 is secured to the central portion of the support member 95. The electric motor 93 and the movable portions 92 slidably supported by the respective guide portions 91 are connected via associated push cables (drive devices) 96. The movable portions 92 are moved upward and downward by the drive of the electric motor 93 while being guided by the respective guide portions 91 via the respective push cables 96. In this case, when the movable portions 92 are moved upward, for example, positive and negative voltages are applied to a terminal and a connector connected to the electric motor 93 to turn the electric motor 93 in a desired direction. Thus, the movable portions 92 are moved upward via the push cables 96 (see reference numeral 92' in FIG. 6).

On the other hand, when the movable portions 92 are moved downward, for example, negative and positive voltages are reversely applied to the terminal and connector connected to the electric motor 93 to turn the electric motor in the reverse direction. Thus, the movable portions 92 are moved downward via the push cables 96 (see reference numeral 92 in FIG. 6).

As shown in FIGS. 5 and 8, the connecting portion 94 connecting the windscreen 51 with the movable portion 92 includes a first member 97 secured to the movable portion 92 and substantially extending in the direction of arrow y (the slant direction) and a second member 98 secured to the windscreen 51.

Referring to FIGS. 5 and 8, the first member 97 is substantially formed as an elongate plate and is provided with a hole portion 99 and a notch portion 100 both formed on the lower end side (the front side of the vehicle body) so as to be secured to the movable portion 92 with attachment members such as screws or the like and with a first projecting portion (securing portion) 101 and a second projecting portion (securing portion) 102 spaced apart from each other at a desired interval in the longitudinal direction of the first member 97. Among them, the first projecting portion 101 is formed substantially at the longitudinally central portion of the first member 97, and the second projecting portion 102 is formed on the upper end side (the rear side of the vehicle body) of the first member 97. The first member 97 is secured to the movable portion 92 via the hole portion 99 and via the notch portion 100, so that it can be moved along with the movement of the movable portion 92.

The second member 98 is a plate-like member having an L shape in cross section. The second member 98 has a first plane 103 connected to the first member 97 and a second plane 104 connected to the windscreen 51. The first plane 103 of the second member 98 has a long hole portion 105 extending from the longitudinal central portion to the lower end side; a first recess portion 106 notched at the central portion of the edge-side of the first plane 103; and a second recess portion 107 notched at the upper end side (the rear side of the vehicle body) of the edge-end side of the first plane 103. The first recess portion 106 and the second recess portion 107 have a retaining portion 106A and a retaining portion 107A, respectively, each of which is bored to extend toward the upper end side. The first and second recess portions 106, 107 respectively having the retaining portions 106A, 107A can be respectively engaged with the first and second projecting portions 101, 102 of the first member 97. Further, the long hole portion 105 and the second recess portion 106 of the second member 98 can be respectively engaged with the first and second projecting portion 101, 102 of the first member 97.

On the other hand, the second plane 104 of the second member 98 is formed with a long hole portion 108 substantially at the longitudinally central portion and with a plurality of (three in total) hole portions 109 formed on both sides of the long hole portion 108. As shown in FIG. 5, the second plane 104 of the second member 98 and the windscreen 51 are abutted against each other. The second member 98 and the windscreen 51 are connected with each other via the long hole portion 108 and hole portions 109 formed in the second plane 104 of the second member 98 by using the attachment members 110 such as screws. Thus, the second member 98 and the windscreen 51 are secured to each other.

As shown in FIGS. 8A and 8B, the second member 98 can be secured to the first member 97 at two different positions longitudinally (i.e., the arrow-y direction, the slant direction). When the second member 98 is secured to the first member 97 at the lowest position (see FIG. 8A) which is a first position or so-called standby position), the first projecting portion 101 of the first member 97 is engaged with the upper end side of the long hole portion 105 of the second member 98, and the second projecting portion 102 of the first member 97 is engaged with the retaining portion 107A of the second recess portion 107 of the second member 98. At this time, the first recess portion 106 of the second member 98 is engaged with nothing.

On the other hand, when the second member 98 is secured to the first member 97 at the most-raised position (FIG. 8B) which is a second position, the first projecting portion 101 of the first member 97 is engaged with the lower end side of the long hole portion 105 of the second member 98, and the second projecting portion 102 of the first member 97 is engaged with the retaining portion 106A of the first recess portion 106 of the second member 98. In this case, the second recess portion 107 of the second member 98 is engaged with nothing.

As described above, the first member 97 includes the first projecting portion (securing portion) 101 and the second projecting portion (securing portion) 102 so that the second member 98 can be secured to the first member 97 at the two different positions substantially in the slant direction.

A procedure for shifting the windscreen 51 is described hereinbelow. When the windscreen 51 is moved upward or downward during a ride, an operation switch (not shown) provided, e.g., near the steering handlebar 4 is operated. When the windscreen 51 is moved upward, the electric motor 93, i.e., the drive device, is driven and turned in the desired direction. This allows the push cables 96 to move the left and right movable portions 92 along the respective guide portions 91. The upward movement of the movable portions 92 along the respective guide portions 91 allows the windscreen 51 connected to the movable portions 92 via the respective connecting portions 94 to move substantially in the slant direction and be disposed at an upper position (see reference numeral 51' in FIG. 5). As shown in FIGS. 5 and 7, in the present embodiment, the guide portion 91 is formed to arcuately and slightly protrude toward the rearward of the vehicle body. Therefore, when moving upward, the windscreen 51 is not moved to completely coincide with the slant direction. Instead, the windscreen 51 uprises as shown in FIG. 5 as it is moved upward.

On the other hand, when the windscreen 51 is moved downward, the electric motor 93 is reversely turned. This allows the push cables 96 to move the left and right movable portions 92 downward along the respective guide portions 91. The downward movement of the movable portions 92 along the respective guide portions 91 disposes the windscreen 51 at a lower position. In this case, since the guide portion 91 is formed to slightly and arcuately protrude toward the rearward of the vehicle body, the windscreen 51 moved downward is slanted toward the rear side of the vehicle body as it is lowered. As described above, the movable portions 92 are moved along the respective guide portions 91 by use of the electric motor 93, which moves the windscreen 51 upward and downward.

Figure 9:
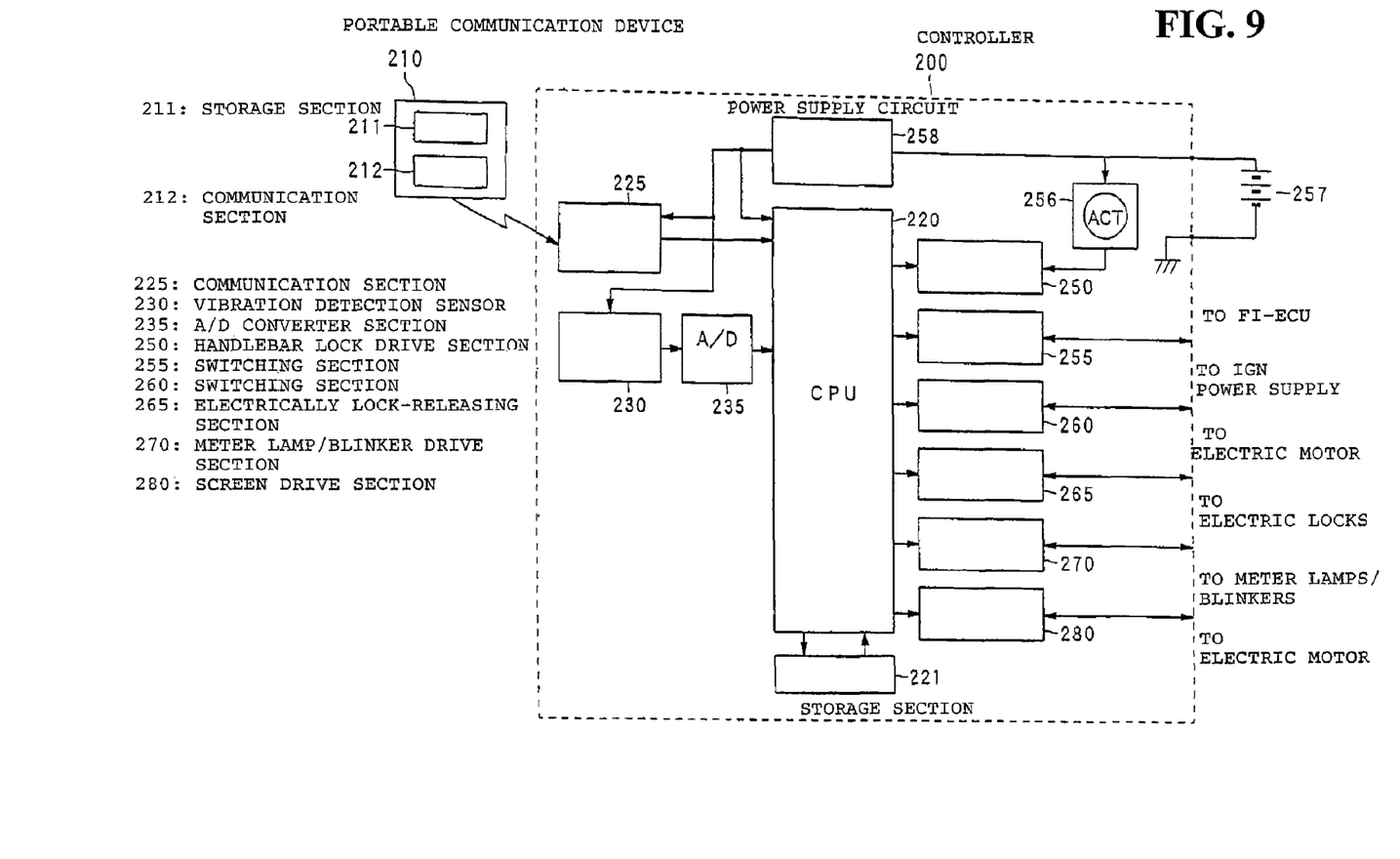
FIG. 9 is a block diagram illustrating a controller in accordance with an embodiment of the present invention.

FIG. 9 is a block diagram illustrating the controller 200 of the illustrated embodiment. The controller 200 also serves as a control device for the windscreen 51.

In the illustrated embodiment, if a portable communication device 210 carried by a user of the motorcycle 10 is located near the vehicle body, some operations such as start of the engine 17 or the like are can be performed, and the windscreen 51 can be driven to a predetermined restoration position. If the portable communication device 210 is away from the vehicle body, the operations of start of the engine 17 or the like will not be performed and the windscreen 51 will be driven to a predetermined standby position.

The portable communication device 210 is configured to include a storage section 211 which stores a unique identification information ID identifying the device 210, and a communication section 212 which sends by wireless a signal on which the identification information ID is superimposed.

The controller 200 is provided with a computer configuration including a CPU 220 as a control section and a storage section 221 such as EEPROM or the like storing various data such as a control program and the like. The CPU 220 executes the control program stored in the storage section 221 to control the various electric components of the vehicle body. The controller 200 includes a communication section (receiver) 225 and a vibration detection sensor 230, for sending signals to the CPU 220.

The communication section 225 receives via an antenna (not shown) a signal transmitted from the portable communication device 210 and sends the signal to the CPU 220. The CPU 220 may have a function of monitoring whether or not the portable communication device 210 carried by the owner is located near the vehicle body by continuously determining whether or not the identification information ID contained in the signal received matches the registration information ID0 preliminarily stored in the storage section 221.

The vibration detection sensor 230 outputs a vibration detection signal proportional to vibration applied to a handlebar lock module which electrically locks the handlebar 15. The A/D converter section 235 converts the analog vibration detection signal and outputs the converted digital signal to the CPU 220. The CPU 220 outputs a theft detection signal when the vibration is equal to or greater than a preset threshold value.

A handlebar lock drive section 250, switching sections 255, 260, electrically lock-releasing section 265, a meter lamp/blinker drive section 270, and a screen drive section 280 are provided at the output end of the CPU 220.

The handlebar lock drive section 250 drives a handlebar lock actuator 256 under the control of the CPU 220. The handlebar lock drive section 250 releases a handlebar lock if the identification information ID contained in the received signal matches the registration information ID0, or maintains a handlebar-locked state if the identification information ID contained in the received signal does not match the registration information ID0. As shown in FIG. 9, a battery 257 is mounted on the motorcycle 10 and a power supply circuit 258 is connected to the positive end of the battery 257.

The switching section 255 permits or prohibits the operation of a fuel injection controller (FI-ECU) under the control of the CPU 220. The switching section permits the operation of the fuel injection controller if the identification information ID contained in the received signal matches the registration information ID0 and prohibits the operation of the fuel injection controller if the identification information ID contained in the received signal does not match the registration information ID0.

The switching section 260 permits or prohibits the supply of ignition power under the control of the CPU 220. The switching section 260 permits the supply of the ignition power if the identification information ID contained in the received signal matches the registration information ID0 and prohibits the supply of the ignition power if the identification information ID contained in the received signal does not match the registration information ID0.

In this way, if the identification information ID contained in the received signal match the registration information ID0, the start of the engine 17 by the user (rider) is permitted and predetermined engine start operations can be performed manually or automatically to start the engine 17. In contrast, if the identification information ID contained in the received signal does not match the registration information ID0, the engine 17 is not started even if the engine start operations are performed.

The electrically lock-releasing section 265 permits or prohibits the release of the electric locks provided for the trunk box 27, the saddlebags 45, etc., under the control of the CPU 220. If the identification information ID contained in the received signal matches the registration information ID0, the lock-releasing section 265 permits the release of the electric locks, and the electric locks are released in response to predetermined opening operations. If the identification information ID contained in the received signal does not match the registration information ID0, the electric locks are not released even if the opening operations are performed.

The meter lamp/blinker drive section 270 activates the lamps in the vehicle meters 55, the front blinkers 52 and the rear blinkers 61 under the control of the CPU 220. While the identification information ID contained in the received signal does not match the registration information ID0, of the lamps in the vehicle motors 55, for example, a lamp adapted to inform that the theft prevention device is in operation is activated. For example, if the state where the identification information ID contained in the received signal does not match the registration information ID0 changes to the state where the identification information ID contained in the received signal matches the registration information ID0, the front blinkers 52 and the rear blinkers 61 will be blinking in a predetermined manner, or vice versa.

The screen drive section 280 drives the electric motor 93 (see FIG. 6) for moving the windscreen 51 under the control of the CPU 220. When the portable communication device 210 is away from the vehicle body, the screen drive section 280 drives the electric motor 93 to lower the windscreen 51 to the lowest position.

Figure 10:
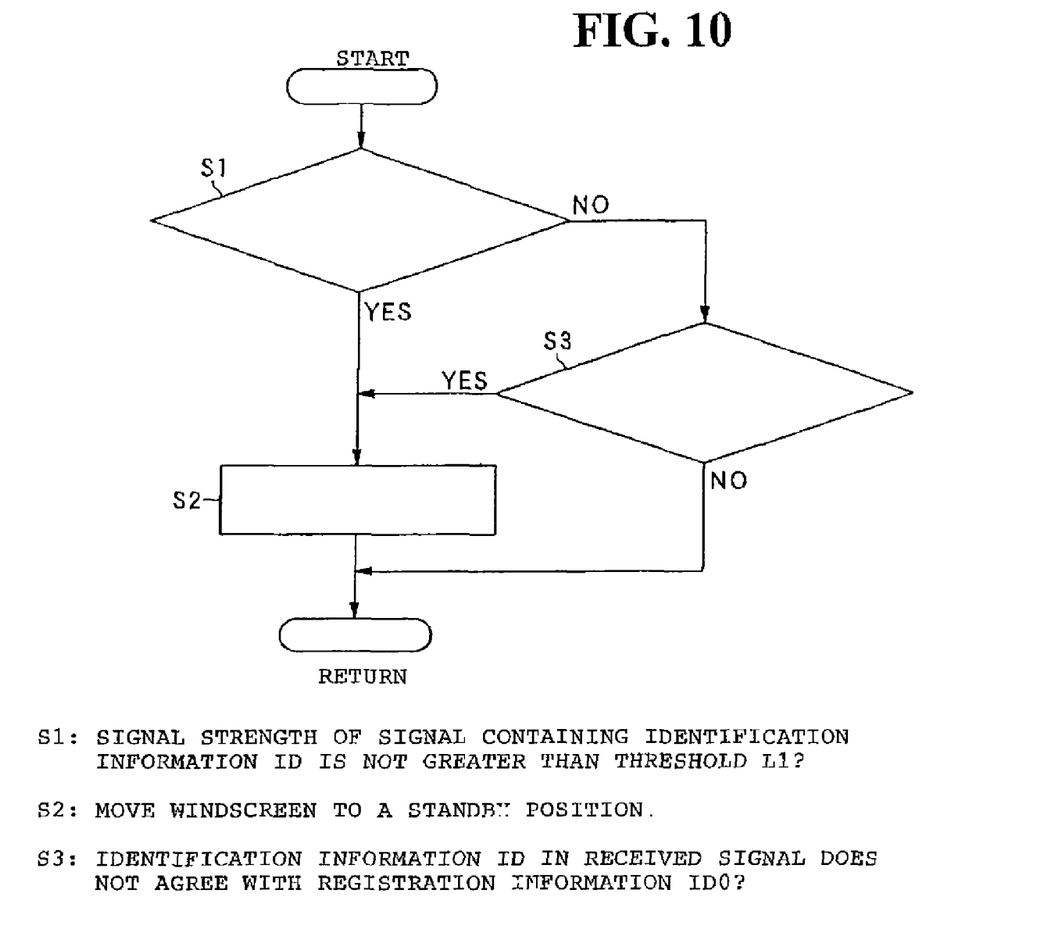
FIG. 10 is a flowchart for illustrating the control operation for the windscreen in accordance with an embodiment of the present invention.

The control operation of the windscreen 51 in the illustrated embodiment is described hereinbelow. FIG. 10 is a flowchart illustrating the control operation/process. This process is repeatedly executed at a predetermined interrupt cycle if the identification information ID contained in a received signal matches the registration information ID0.

If the identification information ID contained in a received signal matches the registration information ID0, the CPU 220 first judges whether or not the signal strength of the received signal is equal to or less than a predetermined threshold value L0 (step S1). The threshold value L0 is set at the signal strength from which a judgment can be made that the user (rider) carrying the portable communication device 210 dismounts from the vehicle body. For example, the threshold value L0 is set at the signal strength when the portable communication device 210 is away several meters from the vehicle body. In short, a first judgment process is executed in which an accurate judgment can be made from the signal strength as to whether or not the user (rider) carrying the portable communication device 210 dismounts from the motorcycle.

Subsequently, if it is judged that the signal strength is equal to or less than the threshold value L0 (step S1: YES), the CPU 220 drives the electric motor 93 to lower (move) the windscreen 51 to the lowest position which is a standby position (step S2).

On the other hand, if the signal strength exceeds the threshold value L0 (step S1: NO), the CPU 220 judges whether or not identification information ID contained in a newly received signal matches the registration information ID0 (step S3). If the identification information ID contained in the received signal does not match the registration information ID0, it is judged that this portable communication device 210 is not for the vehicle body. In short, a second judgment process is executed in which an accurate judgment can be made from the received identification information ID as to whether or not the user (rider) carrying the portable communication device 210 can activate the motorcycle.

In this way, if the identification information ID contained in the received signal does not match the registration information ID0 (step S3: YES), the CPU 220 shifts to step S2 and execute the process thereof. That is, the CPU 220 drives the electric motor 93 to lower the windscreen 51 to the lowest position or keeps the windscreen 51 at the lowest position.

If the identification information ID contained in the newly received signal matches the registration information ID0 (step S3: NO), the CPU 220 can judge that the user (rider) carrying the portable communication device 210 is taking or going to take a ride on the motorcycle. Thus, the process is finished without changing the position of the windscreen 51 if the windscreen 51 is located at the most-raised position. If the windscreen 51 is located at the lowest/standby position, the CPU 220 will drive the electric motor 93 to raise the windscreen 51 to the most-raised position. As described above, this process is repeatedly executed if the identification information ID contained in the received signal matches the registration information ID0. It is possible therefore to reliably detect the case where the user (rider) carrying the portable communication device 210 dismounts from the motorcycle. In such a case, the windscreen 51 can be lowered to the lowest position. According to the illustrated embodiment as described above, the controller 200 judges whether or not the portable communication device 210 is away from the vehicle body on the basis of the signal received by the communication section 225 which receives the signal transmitted from the portable transmission device 210. If it is judged that the portable communication device 210 is away from the vehicle body, the screen drive section 280 lowers the windscreen 51 to the lowest position. In short, if the user (rider) dismounts from the motorcycle and is away from the vehicle body, the windscreen 51 can be lowered to the lowest position.

Thus, when the user (rider) dismounts from the motorcycle, it is not necessary to perform the switch operation for operating the windscreen and the windscreen 51 can be lowered at the time of parking without using a component for detecting user's parking operation.

Since the windscreen 51 is lowered at the time of parking as described above, even if strong wind blows during the parking, the influence of the strong wind on the vehicle body can be significantly reduced. It is also easier to cover the vehicle body with a body cover when the windscreen 51 is located at the lowest position. In particular, in the present configuration as shown in the illustrated embodiment, since the windscreen 51 is slanted toward the rearward of the vehicle body as it is lowered, the effect described above can further be increased.

In addition, sunlight from the rearward of the windscreen 51 may be reflected by the windscreen 51 to the vehicle body, which may require a light-focusing countermeasure arranging higher-temperature resistant materials in the entire light-focusing range in the movable range of the windscreen 51. However, in the present configuration, since the windscreen 51 is surely brought to the lowest position during parking, it is possible to remarkably reduce the range to need the light-focusing countermeasure because the reflection is significantly reduced.

In the embodiment described above, the controller 200 may judge whether or not the portable communication device 210 is close to the vehicle body on the basis of the signal received by the communication section 225 which receives the signal transmitted from the portable transmission device 210. If it is judged that the portable communication device 210 is close to the vehicle body, the screen drive section 280 may move the windscreen 51 to a predetermined restoration position. In this case, preferably, the restoration position is stored in the storage section 221 and the windscreen is moved to the restoration position as stored in the storage section 221. With this configuration, the windscreen 51 can be move to an appropriate height at the time of riding without manually performing switch operation for operating the windscreen and without using a component for detecting user's parking operation.

An operating element (operating section for inputting a restoration position) may be provided which is used by a user (rider) to input or set a restoration position and the restoration position thus inputted may be stored in the storage section 221. With this configuration, the windscreen 51 can be moved to a user's desired height. Alternatively, a position before the windscreen 51 has been lowered to the lowest position, namely, a position of the windscreen 51 before the dismount (corresponding to the position at the time of the previous riding) may be stored in the storage section 221 and the position at the time of the previous riding may be taken as a restoration position.

The present invention is not limited to such a configuration as described above in which the restoration position stored in the storage section 221 is rewritable. The position of the windscreen 51 adjusted to a person (rider) with average physical size may be stored and taken as the restoration position.

The embodiments have described the case where the present invention is applied to the windshield controller of the motorcycle 10 described above. However, the present invention is not limited to this and can also be applied to the windshield controller of other motorcycles such as scooter type vehicles and the like.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A windshield controller for a motorcycle, comprising:
   a receiver which receives a signal transmitted from a portable communication device;
   a start permission device which judges whether or not to permit start of an engine based on the signal received by the receiver; and
   a control device which controllably drives a movable windscreen disposed on a cowling at a front portion of a vehicle body, wherein the control device judges whether or not the portable communication device is away from the vehicle body based on the signal received by the receiver, and when it is judged that the portable communication device is away from the vehicle body, the control device controls to move the movable windscreen to a standby position.

2. The windshield controller of claim 1, wherein the control device judges whether or not signal strength of the signal transmitted from the portable communication device is less than a predetermined threshold value, and when the signal strength is less than the threshold value, it is judged that the portable communication device is away from the vehicle body.

3. The windshield controller of claim 1, wherein the control section judges whether or not identification information contained in the signal received by the receiver match registration information, and when the identification information does not match the registration information, it is judged that the portable communication device is away from the vehicle body.

4. The windshield controller of claim 1, wherein the standby position is a lowest position of the movable windscreen.

5. The windshield controller of claim 4, wherein the movable windscreen is slanted toward rearward of the vehicle body as the windscreen is lowered.

6. The windshield controller of claim 1, wherein the control device judges whether or not the portable communication section is close to the vehicle body based on the signal received by the receiver, and when it is judged that the portable windscreen is close to the vehicle body, the windscreen is moved to a restoration position.

7. The windshield controller of claim 6, further comprising:
   a restoration position device which inputs a restoration position; and
   a storage device which stores the restoration position;
   wherein the control device moves the windscreen to the restoration position as stored in the storage device.

8. The windshield controller of claim 6, wherein the restoration position is higher than the standby position.

9. The windshield controller of claim 6, wherein a slant angle of the restoration position is larger than a slant angle of the standby position.

10. A windshield controller of a vehicle, comprising:
   a detection device configured to detect whether a user of the vehicle dismounts from the vehicle;
   a controller configured to drive a movable windscreen to either a standby position or a restoration position,
   wherein the controller drives the movable windscreen to the standby position when the detection device detects that the user of the vehicle dismounts from the vehicle, and the controller drives the movable windscreen to the restoration position when the detection device detects that the user of the vehicle does not dismount from the vehicle.

11. The windshield controller of claim 10, wherein the detection device detects that the user of the vehicle dismounts from the vehicle when signal strength of a signal transmitted from a portable communication device to the controller is less than a predetermined threshold value.

12. The windshield controller of claim 10, wherein the detection device detects that the user of the vehicle dismounts from the vehicle to the controller when identification information in a signal transmitted from a portable communication device to the controller does not match registration information stored in the controller.

13. The windshield controller of claim 10, wherein the restoration position is higher than the standby position.

14. The windshield controller of claim 10, wherein a slant angle of the restoration position is larger than a slant angle of the standby position.

15. The windshield controller of claim 10, further comprising:
   a restoration position device configured to input a restoration position; and
   a storage device configured to store the restoration position.

* * * * *